(12) United States Patent
Stadler

(10) Patent No.: US 9,790,714 B1
(45) Date of Patent: Oct. 17, 2017

(54) LOCKING COVER ASSEMBLY FOR PREVENTING UNAUTHORIZED ACCESS TO A UTILITY SHUT OFF VALVE

(71) Applicant: David Stadler, Lathrup Village, MI (US)

(72) Inventor: David Stadler, Lathrup Village, MI (US)

( * ) Notice: Subject to any disclaimer, the term of this patent is extended or adjusted under 35 U.S.C. 154(b) by 0 days.

(21) Appl. No.: 15/474,035

(22) Filed: Mar. 30, 2017

Related U.S. Application Data

(60) Provisional application No. 62/315,865, filed on Mar. 31, 2016.

(51) Int. Cl.
| | |
|---|---|
| *E05B 65/52* | (2006.01) |
| *E05B 65/00* | (2006.01) |
| *E05B 35/00* | (2006.01) |
| *E05B 17/20* | (2006.01) |
| *E02D 29/12* | (2006.01) |

(52) U.S. Cl.
CPC .......... *E05B 65/0089* (2013.01); *E02D 29/12* (2013.01); *E05B 17/2084* (2013.01); *E05B 35/008* (2013.01); *E05B 65/006* (2013.01)

(58) Field of Classification Search
CPC ............... E05B 65/0089; E05B 65/006; E05B 17/2084; E05B 35/008; E02D 29/12; E02D 29/14; E02D 29/1427
USPC ..... 70/158, 163–173, 175–179; 292/64, 155, 292/176, 212, 251, 256.71, 256.73, 292/256.75, DIG. 11; 404/25, 26
See application file for complete search history.

(56) References Cited

U.S. PATENT DOCUMENTS

| | | | | |
|---|---|---|---|---|
| 148,102 | A | * | 3/1874 | Williamson et al. ..... E03B 9/10 137/371 |
| 832,093 | A | * | 10/1906 | Stoltzpus ................. F16J 13/20 126/319 |
| 1,327,011 | A | * | 1/1920 | Arndt ...................... F16B 2/065 220/328 |

(Continued)

*Primary Examiner* — Lloyd Gall
(74) *Attorney, Agent, or Firm* — John R. Benefiel

(57) ABSTRACT

A security cover assembly for limiting access to a utility shut off valve through an open topped curb box, including a security screw extending through a hole in a cover member, the cover member configured to cover the open top of the curb box to enabling moving of the clamping plate up and down in the curb box by rotation of the security screw in respective opposite directions. A cutout into the clamping plate perimeter allows the clamping plate to be lowered to a level in the curb box beneath a flange projecting radially inwardly from an outer wall of the curb box. In the lowered position, the clamping plate may be rotated with the cover assembly to position a portion of the clamping plate beneath an underside of the flange. The clamping plate is thereafter elevated to be engaged with the underside of the flange upon rotation of the security screw in a direction raising the clamping plate. Rotation of the cover assembly back in the opposite direction to align the cutout in the clamping plate with the flange can be done once the clamping plate is lowered out of engagement with the underside of the flange by rotation of the security screw in an opposite direction, allowing the cover assembly to be lifted out of the curb box and thereby permitting access to the shut off valve.

6 Claims, 4 Drawing Sheets

(56) References Cited

U.S. PATENT DOCUMENTS

| | | | | | |
|---|---|---|---|---|---|
| 1,357,864 | A | * | 11/1920 | Harrington | E05B 65/0057 27/DIG. 1 |
| 1,433,430 | A | * | 10/1922 | Taylor | E05B 65/0057 292/212 |
| 1,551,311 | A | * | 8/1925 | Klein et al. | E05C 3/042 160/369 |
| 1,704,854 | A | * | 3/1929 | Burgess | F16J 13/02 292/149 |
| 1,826,817 | A | * | 10/1931 | Olley | E05B 65/006 292/256.73 |
| 2,057,866 | A | * | 10/1936 | Weber | E02D 29/1427 49/465 |
| 2,334,012 | A | * | 11/1943 | Koch | H01H 9/04 174/560 |
| 3,244,442 | A | * | 4/1966 | Arbogast | F24C 15/08 292/212 |
| 3,490,637 | A | * | 1/1970 | Pope | E05B 65/006 220/3.4 |
| 4,395,062 | A | * | 7/1983 | F'Geppert | E05B 65/006 24/DIG. 53 |
| 4,763,449 | A | * | 8/1988 | Vigneron | E02D 29/14 220/301 |
| 5,205,668 | A | * | 4/1993 | Adams | E02D 29/14 404/26 |
| 8,851,790 | B1 | * | 10/2014 | Joyce | E06B 7/2301 404/25 |
| 8,991,226 | B2 | * | 3/2015 | Daniels | E05B 65/00 220/325 |
| 9,322,144 | B2 | * | 4/2016 | Sinclair | E02D 29/14 |
| 9,663,973 | B2 | * | 5/2017 | Foster | E05B 65/006 |
| 2005/0241349 | A1 | * | 11/2005 | Monneret | E02D 29/1427 70/169 |
| 2007/0081856 | A1 | * | 4/2007 | DeGreef | E02D 29/1427 404/25 |
| 2013/0126532 | A1 | * | 5/2013 | Kothy | E05B 17/2084 220/327 |
| 2013/0205674 | A1 | * | 8/2013 | Damon | E05B 17/0025 49/465 |
| 2013/0221688 | A1 | * | 8/2013 | Stadler | E02D 29/1427 292/155 |
| 2016/0053458 | A1 | * | 2/2016 | Stadler | E02D 29/1418 404/25 |

* cited by examiner

LOCKING COVER ASSEMBLY FOR PREVENTING UNAUTHORIZED ACCESS TO A UTILITY SHUT OFF VALVE

CROSS REFERENCE TO RELATED PATENT APPLICATION

This application claims the benefit of U.S. provisional patent application No. 62/315,865 filed on Mar. 31, 2016.

BACKGROUND OF THE INVENTION

The present invention concerns limiting access to a below grade shut off valve controlling a utility service to an individual customer for use by water, gas or other utilities. Such shut off valves are provided to enable utility personnel to shut off service as to nonpaying customers or for servicing the plumbing connections to a customer, etc. The shut off valves are located a sufficient distance below the surface in order to avoid freeze up in the case of a water supply utility. A cover is attached to the open top of a curb box located at the surface with a stand pipe extending down to a shut off valve. Despite its name, such curb boxes may be round as shown in the drawings. A pentagonal head security bolt is currently used to secure the cover in place, the bolt advanced through a hole in the cover and into a threaded hole formed in an integral flange projecting radially inwardly from a perimeter wall of the curb box. The special pentagonal wrenches needed to remove such a bolt are in very widespread use and are readily obtained by members of the public. It is easy for a nonpaying customer to obtain such a wrench, remove the security bolt and cover, and turn the water back on. Sometimes a customer will fill the curb box and perhaps the stand pipe as well with concrete to prevent utility personnel from again shutting off the water which actions creates a considerable challenge to service personnel to undo.

A more sophisticated security cover screw is now available commercially such as from Bryce Fastener of Gilbert Ariz., which uses a customized key mating with features arranged in an annular space of a shape unique to a given utility company, which keys are not easily available to a member of the general public. This reduces the problem created by reliance on an easily obtained wrench having a pentagonal shape. However, the cover is still vulnerable to being pried off or broken open.

In addition, due to the frequent great age of such fittings, the flange normally having a threaded hole receiving the security bolt is often damaged to a degree such that no threaded fastener can be effectively held in the threaded hole.

Another problem is that holes may be drilled into the bolt head or to the access cover itself to enable prying the cover to enable its forcible removal and thereby allow unauthorized access to the shut off valve.

It is an object of the present invention to provide an improved combination of a cover assembly connected to a prior art curb box by a much more rugged and effective means than by a security bolt installed in the flange threaded hole, as described above. This improved combination can render the security cover less vulnerable to being pried out or broken open to prevent unauthorized access to a shut off valve.

SUMMARY OF THE INVENTION

The above recited object is achieved by an improved access cover assembly combined with a prior art curb box. The cover assembly includes a cover member which is held in position extending over and completely covering the open top of an associated curb box. A security screw passes down through a hole in the cover member and is threaded into a clamping plate mounted in the cover assembly so as to rotate with the cover member, and which is thereby positioned below and parallel to the cover member. The clamping plate is movable vertically relative a curb box flange by rotation of the security screw between a level above a curb box flange projecting radially inwardly from an outer wall of the curb box and a level below the flange.

The clamping plate is shaped so as to be able to be rotated within the curb box together with the cover member, and is formed with a cut out extending inwardly from the perimeter of the clamping plate and matching the shape of the curb box flange. When the cut out is aligned with the flange of the curb box achieved by manual rotation of the cover assembly, the clamping plate can be moved up or down moving past the flange by rotation of the security screw. When the clamping plate is positioned below the flange, the entire cover assembly can then be manually turned to bring a portion of the clamping plate to position beneath the flange.

When the security screw is then rotated in a direction so as to elevate the clamping plate with the clamping plate portion positioned beneath the flange, an engagement of the clamping plate with an undersurface of the flange results. This then prevents any further rotation of the cover assembly as long as the security screw remains tightened with the clamping plate forced against the undersurface of the flange. This engagement positively prevents the cover member from being rotated back to the position where the cut out and flange are aligned and, thereby allow the cover assembly from being removed from the curb box. To release that engagement, the security screw is turned in a reverse direction so as to move the clamping plate away from its engagement with the underside of the flange.

The cover assembly can then be manually rotated to again align the clamping plate cut out with the flange allowing removal of the cover assembly by it being lifted out through the open top of the curb box. This allows access to the shut off valve located beneath the now opened curb box in the well known manner.

The clamping engagement between the clamping plate and the flange creates a very rugged connection of the cover assembly to the curb box very resistant to prying or breaking up of the cover member.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
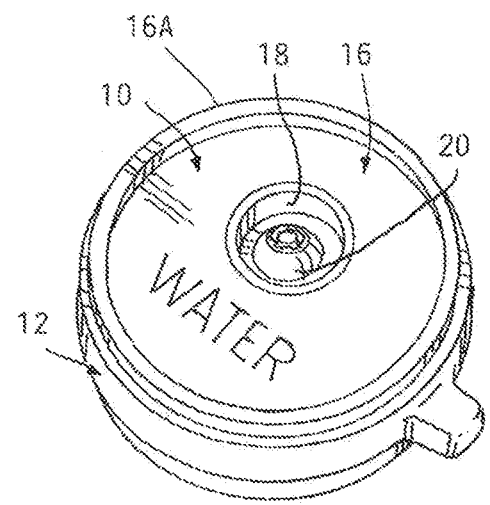
FIG. 1 is a perspective view of a cover assembly combined with a prior art curb box according to the present invention.
Figure 2:
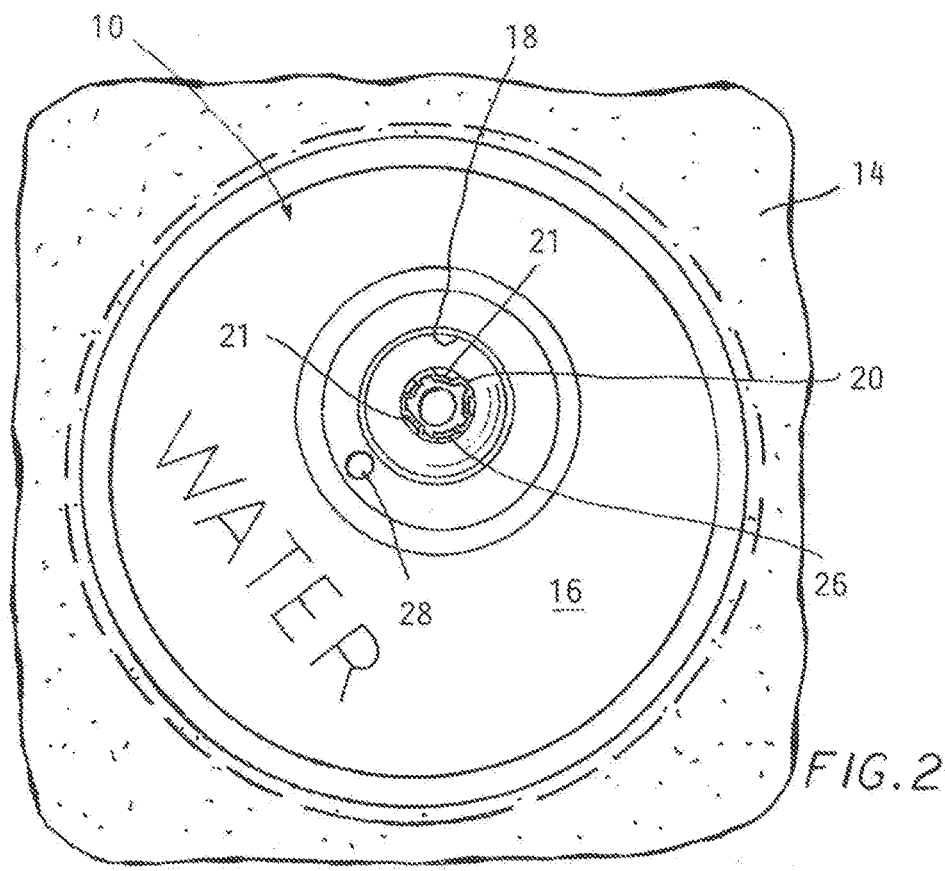
FIG. 2 is an enlarged top view of the cover assembly shown in FIG. 1 showing details of the security screw head.

Referring to the drawings, and in particular FIG. 1, the generally round cover assembly 10 according to the present invention is combined with a prior art curb box 12, the curb box 12 typically encased in paving 14 as shown in FIG. 2.

A cover member 16 included in the cover assembly has an upper rim 16A which rests atop a smaller diameter lower rim 16B (FIG. 7) which is received in the open top 12A of the curb box 12.

The round cover member 16 of the cover assembly 10 has a recess 18 formed extending into the upper surface thereof, in which the head 20 of a security screw 22 (preferably made of stainless steel) is disposed. The cover member 16 may also be made of stainless steel to be resistant to impacts. A plastic cap 24 (FIG. 3) normally covering the recess 18 is not shown installed in FIG. 1.

The head 20 of the security screw is preferably of a special type commercially available from Bryce Fastener as mentioned above and has an annular space 26 formed with a pattern of features 21 which must be matched by a special socket key (not shown) to be received into the annular space 26 (FIG. 2) and to engaged therewith. The exact shape is preferably customized for a given utility or a limited number of utilities. Such customized security screws and mating socket keys are not easily available to members of the public.

The prior art curb box 12 has a flange 48 integral with an outer wall 44 of the curb box 12 projecting radially into an inner space 13 (FIG. 4) defined within the outer wall 44 of the round curb box 12, with a threaded hole 15 conventionally provided which in the prior practice receives a pentagonal headed bolt (not shown) to hold the cover assembly 10 therein.

An air vent hole 28 allows easy installation of the tight fitting cap 24.

The hole 28 also provides a convenient feature engagable as with a tool (not shown) to facilitate lifting the cover assembly 10 out of the curb box 12.

The present invention provides a much more rugged connection between the cover member 16 and the curb box 12 than the prior art connection described consisting of a bolt (not shown) threaded into the hole 15, which is not used with the present invention.

Figure 3:
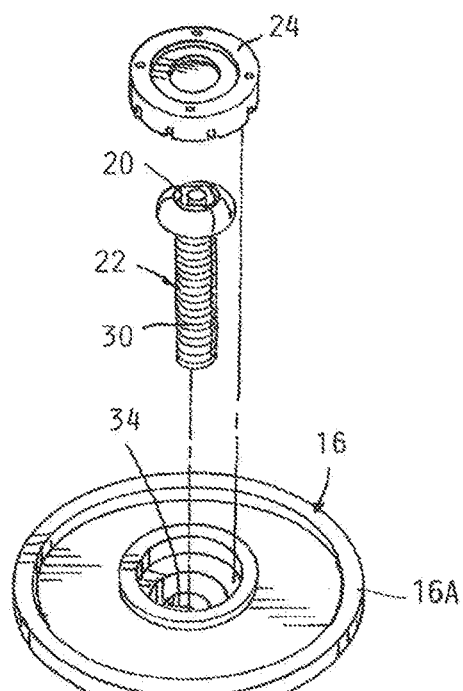
FIG. 3 is an exploded perspective view of the components of the cover assembly to be combined with a prior art curb box according to the invention.
Figure 7:
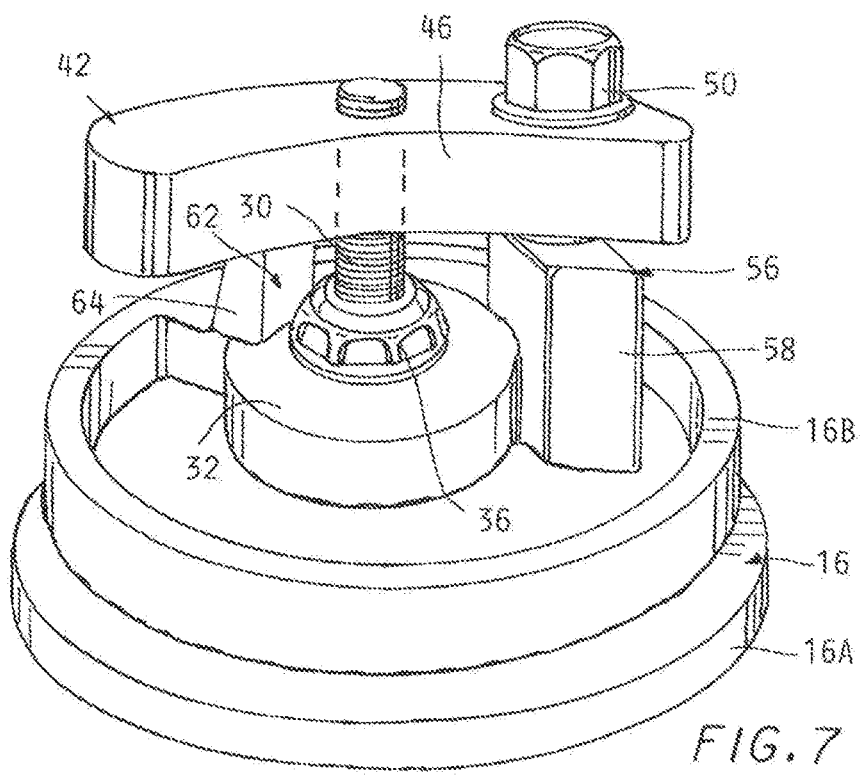
FIG. 7 is a perspective view of the cover assembly in an inverted position.
Figure 8:
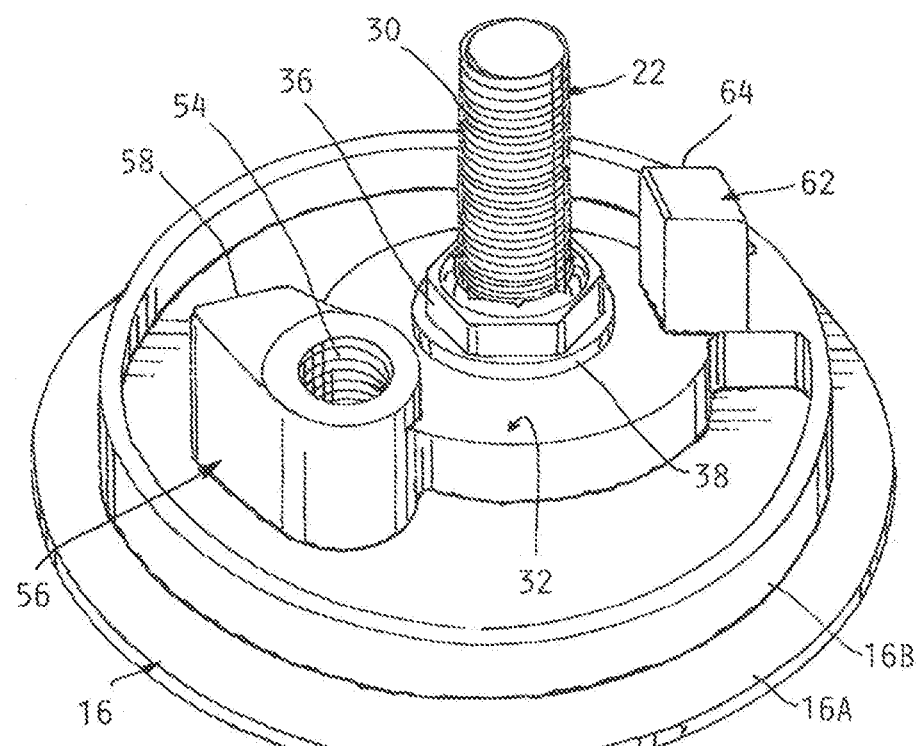
FIG. 8 is a perspective view of the inverted cover assembly as shown in FIG. 7 with the clamping plate removed to better show other features of the cover assembly.

Referring to FIGS. 3, 7 and 8, the security screw 22 used in the present invention (preferably of stainless steel) has a threaded body 30 which protrudes down from the underside 32 of the cover member 16, passing through a central hole 34 in the cover member 16 (FIG. 3). A lock nut 36 is installed on the threaded body 30 so as to be located just below the cover member underside 32 with an interposed washer 38 preferably provided. The lock nut 36 is fixedly held on the screw body 30 so as not be advanced axially when the security screw 22 is rotated and thereby only serves as a stop to maintain the axial position of the security screw threaded body 30 with respect to the cover member 16.

Thus, together with the head 20, the lock nut 36 acts to hold the security screw 22 in a fixed axial position in service projecting down from the underside 32 of the cover member 16. The lower end of the security screw threaded body 30 is threaded into a threaded hole 40 in a clamping plate 42 suspended below and extending parallel with the cover member 16.

Figure 4:
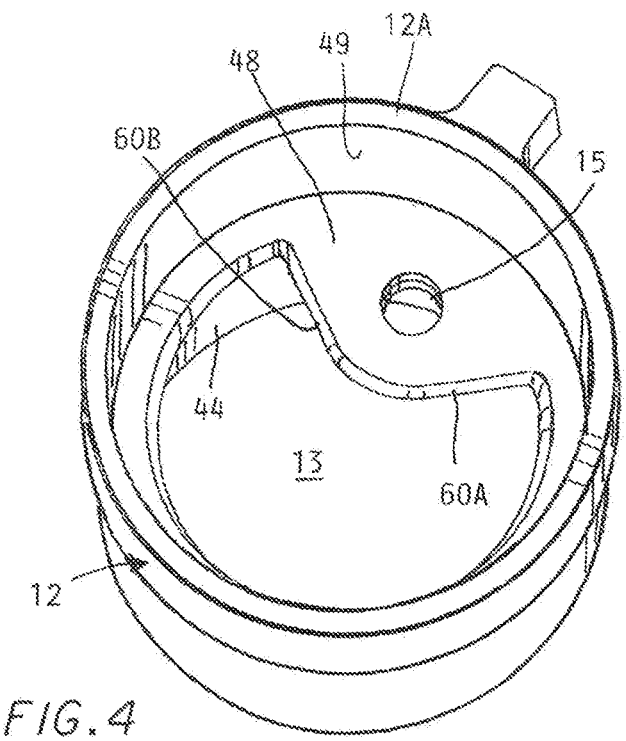
FIG. 4 is an enlarged perspective view from the top of a prior art curb box.

The clamping plate 42 is generally sized and shaped to be slidably fit within a reduced inside diameter interior space formed by an outer wall section 44 of the curb box 12 (FIG. 4). The clamping plate 42 has a generally rounded V shaped cut out 46 formed into the perimeter thereof. The clamping plate cut out 46 is shaped and sized to be matched to the shape of an integral rounded V shaped flange 48 of the curb box 12 projecting radially into an interior space 49 the curb box 12 (FIG. 4), with some clearance therebetween when the cut out 46 is aligned with the flange 48. This will accommodate free downward axial movement of the clamping plate 42 (FIG. 5) past the flange 48 as the screw 22 is rotated in the one direction in the threaded hole 40 (FIG. 3).

An anti-rotation element comprised of a threaded element such as the bolt 50 shown which extends upwardly through a clearance hole 52 located on one side 42A of the outer perimeter of the clamping plate 42 and is threaded into a threaded bore 54 extending upwardly into a first stop structure 56 integrally cast as a part of the cover member 16 and normally projecting down from the underside thereof (FIG. 8). A first stop feature 56 is shown extending up from the inverted cover member 16 as seen in FIGS. 6, 7 and 8.

It can be readily understood that the presence of the antirotation element such as the bolt 50 prevents relative rotation between the clamping plate 42 and the cover member 16 while allowing relative axial movement.

Figure 5:
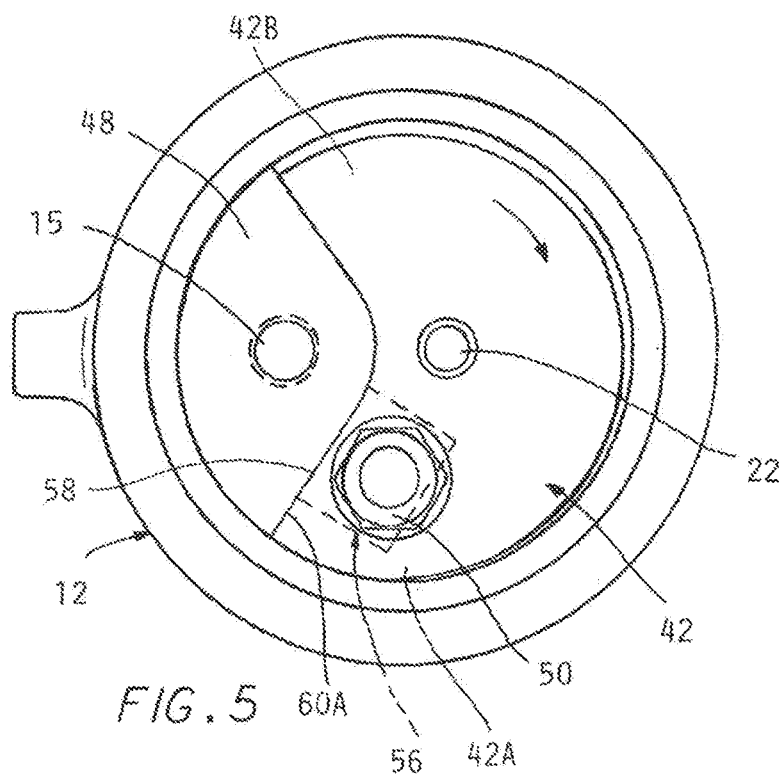
FIG. 5 is a bottom view of the cover assembly combined with a curb box as shown in FIG. 1 with the cover assembly rotated to a position aligning a cut out feature of a clamping plate included in the cover assembly to pass by an interior flange formed on a curb box wall so as to allow installation or lifting out of the cover assembly from the curb box.

The first stop structure 56 has a flat side 58 (FIG. 8) which engages one side 60A of the flange 48 when the lid assembly 10 is rotated in one direction (clockwise as seen in FIG. 5), to establish a position with the cutout 46 aligned with the flange 48 as seen in FIG. 5. This comprises an installation/removal position, allowing the cover assembly 10 to be installed by being lowered into the curb box 12 or to be lifted up and out from the curb box 12 as long as the cutout 46 remains aligned with the flange 48.

Figure 6:
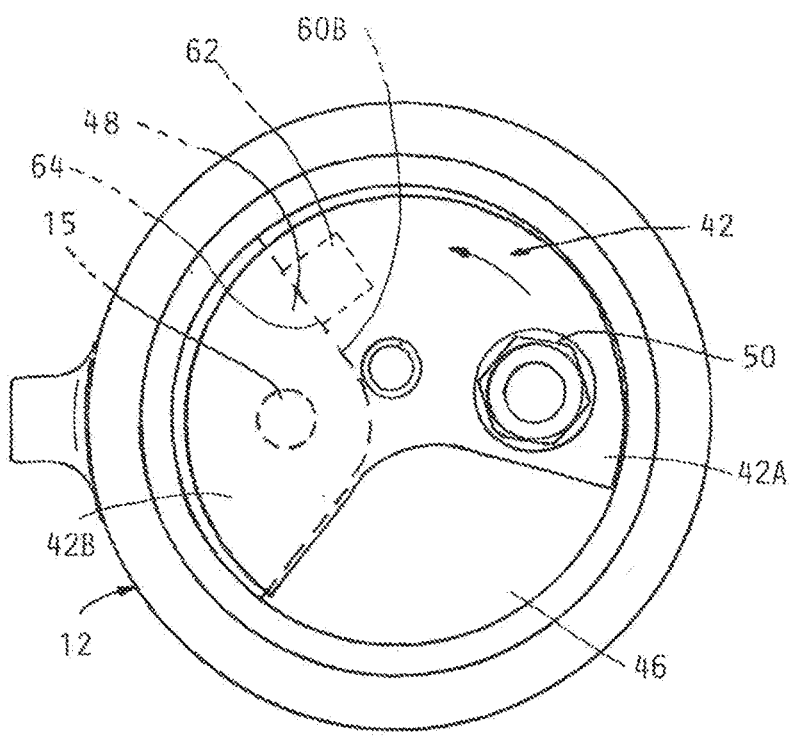
FIG. 6 is a bottom view of the cover assembly and curb box as shown in FIG. 5 but with the cover assembly rotated to move a portion of the clamping plate beneath the curb box flange so as to enable it to be clamped against the flange by being raised by rotation of a security screw.

A second cast in stop structure 62 (FIG. 8) has a flat side 64 which engages the side 60B of the flange 48 when the cover assembly 10 is rotated counterclockwise as seen in FIG. 6, to move the clamping plate 42 to a position with a leading portion 42B of the clamping plate 42 beneath the flange 48 as shown in FIG. 6.

The security screw 22 is then rotated as with the use of a special key (not shown) inserted into space 26 in a direction causing the clamping plate 42 to be drawn up to have a portion thereof tightly engaged with the undersurface of the flange 48, clamping it thereto, and preventing any further rotation of the cover assembly 10 and thus preventing removal of the cover assembly 10 from the curb box 12.

Figure 6A:
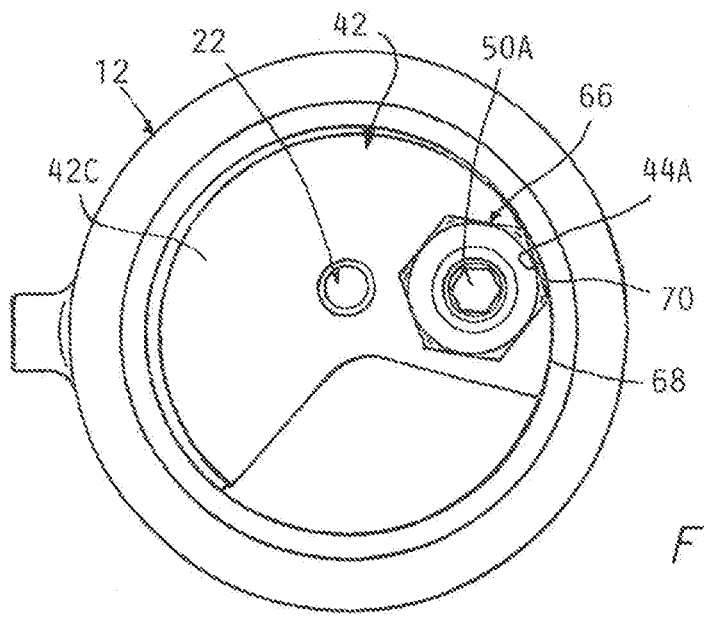
FIG. 6A is a bottom view of the components as shown in FIGS. 5 and 6, but which are modified by the addition of a blocking structure added to the clamping plate to increase the resistance to tilting of the cover assembly in the curb box.

Referring to FIG. 6A, an optional blocking structure 66 may be fixed to the lower face 42C of the clamping plate 42, with one side 70 aligned with an outer edge 68 of the clamping plate 42B to aid in prying of the cover assembly thereof. This locates the outer side 70 thereof immediately next to the surface of outer inside wall surface 44A of the curb box 12. Thus the side 70 engages the curb box wall surface 49 and more effectively blocks tilting of the cover assembly 10.

The blocking structure 66 shown in FIG. 6A is a hex nut so as to conveniently allow a cap screw 50A instead of the bolt 50 to be used passing through the nut opening. However, other annularly shaped structures could be used to obtain the same result.

The flange 48 is available to positively resist prying the cover member 16 off, with the bolt 50 or cap screw 50A and the blocking structure 66 also contributing to the very rugged connection between the cover member 16 and the flange 48 to be very resistant to efforts to pry or break the cover member 16 off. The more centered location of the security screw 22 compared to the prior art security bolt also makes prying off the cover member 16 more difficult.

Thus, a very rugged and simple curb box and cover assembly combination is provided very resistant to breaking or prying efforts and able to remain intact in service for decades.

A preferable additional feature is a surface hardening treatment applied to the security screw 22 and the cover member 16, making drilling thereinto extremely difficult, to effectively deter all attempts to remove the cover assembly 10 as by such drilling.

This process is commercially known as nitro carburization, and makes drilling into these components much more difficult, effectively deterring attempts at removal of the cover assembly 10 by such drilling efforts.

The invention claimed is:

1. A cover assembly in combination with an open topped curb box, said cover assembly including a cover member normally completely covering said open topped curb box for preventing access to a utility shut off valve located below said curb box and only accessible through said open top of said curb box when said cover member is removed from said curb box open top;
   a clamping plate also included in said cover assembly mounted to be rotated with said cover member and held in a position beneath and parallel to said cover member;
   said cover assembly also including a security screw extending through a hole in said cover member and rotatable therein projecting axially down from an underside of said cover member, a lower end of said security screw threaded into a threaded hole in said clamping plate;
   said curb box provided with an integral flange radially projecting inwardly from an outer wall of said curb box into an inner space defined within said curb box outer wall;
   said clamping plate rotatable in said box with said cover member and within said curb box inner space and formed with a cutout extending in from an outer perimeter thereof of a shape matching said flange shape so as to enable said clamping plate to be moved axially past said flange to be disposed within said curb box below said flange after said cover assembly including said cover member and said clamping plate is rotated to align said cutout with said flange, rotation of said cover assembly in one direction after said clamping plate is disposed below said flange causing a portion of said clamping plate to be positioned beneath said flange;
   rotation thereafter of said security screw in one direction causing said clamping plate to thereafter be drawn upwardly into engagement with an underside of said flange to create an engagement between said cover member and said curb box; and, when said security screw is rotated in an opposite direction causing lowering of said clamping plate is produced to be disengaged from said underside of said flange to enable rotation of said cover assembly in said curb box back to said aligned position of said clamping plate cutout and said flange thereby allowing lifting of said cover assembly out through said curb box open top.

2. The combination according to claim 1 wherein said cover member has a pair of stop surfaces fixed thereto, each stop surface formed on a respective one of two spaced apart structures fixed to said cover member projecting down from an underside of said cover member and located to alternatively engage a respective one of a pair of sides spaced apart of said flange by continued rotation of said cover assembly in opposite directions, said cutout aligned with said flange in a rotated position of said cover member with one of said stop surfaces engaged with a respective one of said sides of said flange to allow installation and removal of said cover assembly, and, when the other of said stop surfaces is engaged with an opposite side of said flange by rotation of said cover assembly in an opposite direction, a portion of said clamping plate is moved to be positioned beneath said flange to thereby prevent removal of said cover assembly and cause engagement of an underside of said flange by said portion of said clamping plate upon continued rotation of said security screw in said one direction, preventing rotation of said cover assembly in said curb box.

3. The combination according to claim 2 further including an anti-rotation elongated threaded element carried by said clamping plate and threadably engaged with a threaded hole in one of said structures having at least one of said stop surfaces formed thereon.

4. The combination according to claim 3 wherein a blocking structure is attached to an underside of said clamping plate adjacent an edge of said clamping plate located next to said outer wall of said curb box so as to aid in resisting tilting of said cover assembly.

5. The combination according to claim 4 wherein said blocking structure has an opening receiving said anti-rotation threaded element extending through said opening in said blocking structure.

6. The combination according to claim 1 wherein surfaces of said cover assembly are hardened by nitro carburization thereof.

* * * * *